United States Patent
Beck et al.

(10) Patent No.: US 11,739,617 B2
(45) Date of Patent: Aug. 29, 2023

(54) SHIELDING FOR A MAGNETIC BEARING IN AN ELECTRIC SUBMERSIBLE PUMP (ESP) ASSEMBLY

(71) Applicant: Halliburton Energy Services, Inc., Houston, TX (US)

(72) Inventors: David Christopher Beck, Broken Arrow, OK (US); Ketankumar Kantilal Sheth, Tulsa, OK (US); Robert C. de Long, Sand Springs, OK (US)

(73) Assignee: Halliburton Energy Services, Inc., Houston, TX (US)

(*) Notice: Subject to any disclaimer, the term of this patent is extended or adjusted under 35 U.S.C. 154(b) by 330 days.

(21) Appl. No.: 16/886,208

(22) Filed: May 28, 2020

(65) Prior Publication Data
US 2021/0372242 A1 Dec. 2, 2021

(51) Int. Cl.
| | |
|---|---|
| *E21B 43/12* | (2006.01) |
| *F16C 32/04* | (2006.01) |
| *F04D 29/048* | (2006.01) |
| *F04D 13/10* | (2006.01) |
| *F04D 13/06* | (2006.01) |

(Continued)

(52) U.S. Cl.
CPC ........ *E21B 43/128* (2013.01); *F04D 13/064* (2013.01); *F04D 13/0633* (2013.01); *F04D 13/10* (2013.01); *F04D 29/04* (2013.01); *F04D 29/048* (2013.01); *F16C 32/0402* (2013.01);

(Continued)

(58) Field of Classification Search
CPC .... F04D 29/048; F04D 13/10; F04D 13/0633; F04D 13/064; F04D 29/04; E21B 43/128; H02K 7/09; H02K 5/132; F16C 2360/44; F16C 32/0402; F16C 32/047
See application file for complete search history.

(56) References Cited

U.S. PATENT DOCUMENTS 2,568,548 A * 9/1951 Giles ................. H02K 5/132
                                                  310/86
3,233,950 A    2/1966 Baermann
(Continued)

FOREIGN PATENT DOCUMENTS

AU     2009244521 A1   11/2009
CA        2492069 A1    1/2004
(Continued)

OTHER PUBLICATIONS

Filing Receipt, Specification and Drawing for U.S. Appl. No. 16/886,213, filed May 28, 2020, titled "Hybrid Magnetic Radial Bearing in an Electric Submersible Pump (ESP) Assembly," 43 pages.

(Continued)

*Primary Examiner* — Peter J Bertheaud
(74) *Attorney, Agent, or Firm* — Conley Rose, P.C.; Rodney B. Carroll

(57) ABSTRACT

An electric submersible pump (ESP) assembly. The ESP assembly comprises a centrifugal pump, an electric motor mechanically coupled by a drive shaft to the centrifugal pump, wherein the electric motor comprises a stator and a rotor, a bearing, wherein the bearing is disposed inside the electric motor, and a magnetic shield disposed in the electric motor between bearing and the rotor and stator.

20 Claims, 12 Drawing Sheets

(51) Int. Cl.
*F04D 29/04* (2006.01)
*H02K 7/09* (2006.01)
*H02K 5/132* (2006.01)

(52) U.S. Cl.
CPC ........... *F16C 32/047* (2013.01); *H02K 5/132* (2013.01); *H02K 7/09* (2013.01); *F16C 2360/44* (2013.01)

(56) References Cited

U.S. PATENT DOCUMENTS

| | | | |
|---|---|---|---|
| 3,377,113 | A | 4/1968 | Wilson |
| 4,128,280 | A | 12/1978 | Purtschert |
| 4,379,598 | A | 4/1983 | Goldowsky |
| 5,495,221 | A | 2/1996 | Post |
| 5,749,700 | A | 5/1998 | Henry et al. |
| 6,255,752 | B1 * | 7/2001 | Werner ............... F16C 32/0692 310/90.5 |
| 6,545,378 | B2 | 4/2003 | Chen et al. |
| 6,657,344 | B2 | 12/2003 | Post |
| 6,700,258 | B2 | 3/2004 | McMullen et al. |
| 6,727,617 | B2 | 4/2004 | McMullen et al. |
| 6,965,181 | B1 | 11/2005 | Heshmat et al. |
| 8,330,455 | B2 | 12/2012 | Duppe et al. |
| 8,636,479 | B2 * | 1/2014 | Kenyon ................. F04D 29/403 417/423.5 |
| 8,696,331 | B2 | 4/2014 | Cunningham et al. |
| 2003/0155829 | A1 | 8/2003 | McMullen et al. |
| 2004/0113502 | A1 | 6/2004 | Li et al. |
| 2004/0234391 | A1 | 11/2004 | Izraelev |
| 2006/0037743 | A1 | 2/2006 | Head |
| 2006/0110271 | A1 | 5/2006 | Klabunde et al. |
| 2006/0279149 | A1 | 12/2006 | Asper |
| 2007/0280571 | A1 | 12/2007 | Satoji et al. |
| 2008/0111434 | A1 | 5/2008 | Head |
| 2008/0284268 | A1 | 11/2008 | Yuratich et al. |
| 2011/0052432 | A1 | 3/2011 | Cunningham et al. |
| 2012/0107143 | A1 | 5/2012 | Gilarranz et al. |
| 2014/0347152 | A1 | 11/2014 | Aronstam et al. |
| 2015/0349603 | A1 | 12/2015 | Parmeter |
| 2016/0190893 | A1 | 6/2016 | Parmeter et al. |
| 2018/0051700 | A1 | 2/2018 | Sheth et al. |
| 2018/0100543 | A1 | 4/2018 | Hyatt et al. |
| 2018/0291907 | A1 | 10/2018 | Ye et al. |
| 2019/0085671 | A1 | 3/2019 | Biddick et al. |

FOREIGN PATENT DOCUMENTS

| | | |
|---|---|---|
| CN | 101846131 A | 9/2010 |
| CN | 201726242 U | 1/2011 |
| CN | 104696262 A | 6/2015 |
| EP | 0355796 A2 | 2/1990 |
| EP | 0523002 A1 | 1/1993 |
| EP | 0566806 A1 | 10/1993 |
| EP | 2300687 B1 | 12/2018 |
| JP | 3121819 B2 | 1/2001 |
| WO | 2014133397 A1 | 9/2014 |
| WO | 2018071478 A1 | 4/2018 |

OTHER PUBLICATIONS

Filing Receipt, Specification and Drawing for U.S. Appl. No. 16/899,771, filed Jun. 12, 2020, titled "Hybrid Magnetic Thrust Bearing in an Electric Submersible Pump (ESP) Assembly," 46 pages.
Electronic Acknowledgement Receipt, Specification and Drawings for International Application No. PCT/US2020/035719, filed Jun. 2, 2020, entitled "Shielding for a Magnetic Bearing in an Electric Submersible Pump (ESP) Assembly," 43 pages.
Electronic Acknowledgement Receipt, Specification and Drawings for International Application No. PCT/US2020/035715, filed Jun. 2, 2020, entitled "Hybrid Magnetic Radial Bearing in an Electric Submersible Pump (ESP) Assembly," 39 pages.
Electronic Acknowledgement Receipt, Specification and Drawings for International Application No. PCT/US2020/039182, filed Jun. 23, 2020, entitled "Hybrid Magnetic Thrust Bearing in an Electric Submersible Pump (ESP) Assembly," 42 pages.
Office Action (34 Pages), dated Mar. 8, 2022, U.S. Appl. No. 16/899,771, filed Jun. 12, 2020.
International Search Report and Written Opinion of the International Searching Authority, International Application No. PCT/US2020/035715, dated Nov. 30, 2020, 12 pages.
International Search Report and Written Opinion of the International Searching Authority, International Application No. PCT/US2020/035719, dated Nov. 30, 2020, 12 pages.
Foreign Communication from Related Application—International Search Report and Written Opinion of the International Searching Authority, International Application No. PCT/US2020/039182, dated Feb. 22, 2021, 11 pages.
Office Action (20 Pages), dated Aug. 8, 2022, U.S. Appl. No. 16/899,771, filed Jun. 12, 2020.

* cited by examiner

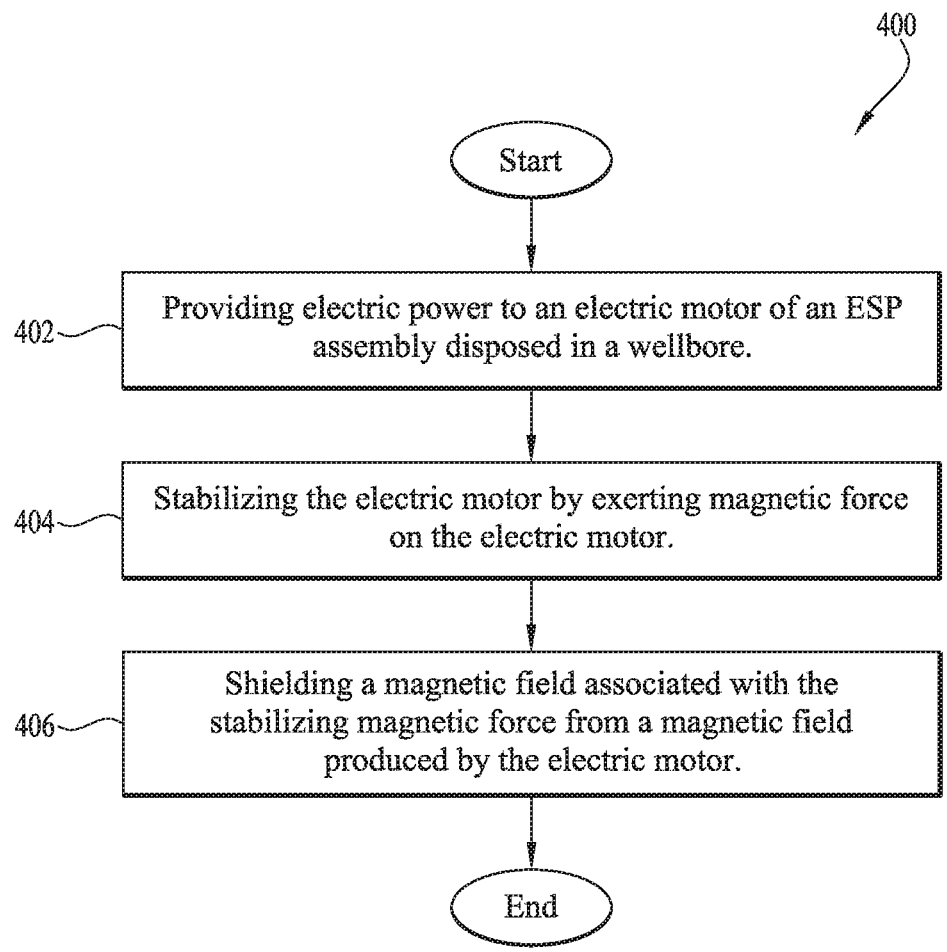

SHIELDING FOR A MAGNETIC BEARING IN AN ELECTRIC SUBMERSIBLE PUMP (ESP) ASSEMBLY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electric submersible pump (ESP) assemblies are used to artificially lift fluid to the surface in wells such as oil or water wells. A typical ESP assembly comprises, from bottom to top, an electric motor, a seal unit, a pump intake, and a centrifugal pump, which are all mechanically connected together with shafts and shaft couplings. The electric motor supplies torque to the shafts, which provides power to the centrifugal pump. The electric motor is isolated from a wellbore environment by a housing and by the seal unit. The seal unit acts as an oil reservoir for the electric motor. The oil functions both as a dielectric fluid and as a lubricant in the electric motor. The seal unit also may provide pressure equalization between the electric motor and the wellbore environment. The centrifugal pump transforms mechanical torque received from the electric motor via a drive shaft to fluid pressure to lift fluid up the wellbore. The electric motor is generally connected to a power source located at the surface of the well using a cable and a motor lead extension. The ESP assembly is placed into the well, usually inside a well casing. In a cased completion, the well casing separates the ESP assembly from the surrounding formation. Perforations in the well casing allow well fluid to enter the well casing and flow to the pump intake.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4 is a flow chart of a method according to an embodiment of the disclosure.

DETAILED DESCRIPTION

Figure 1:
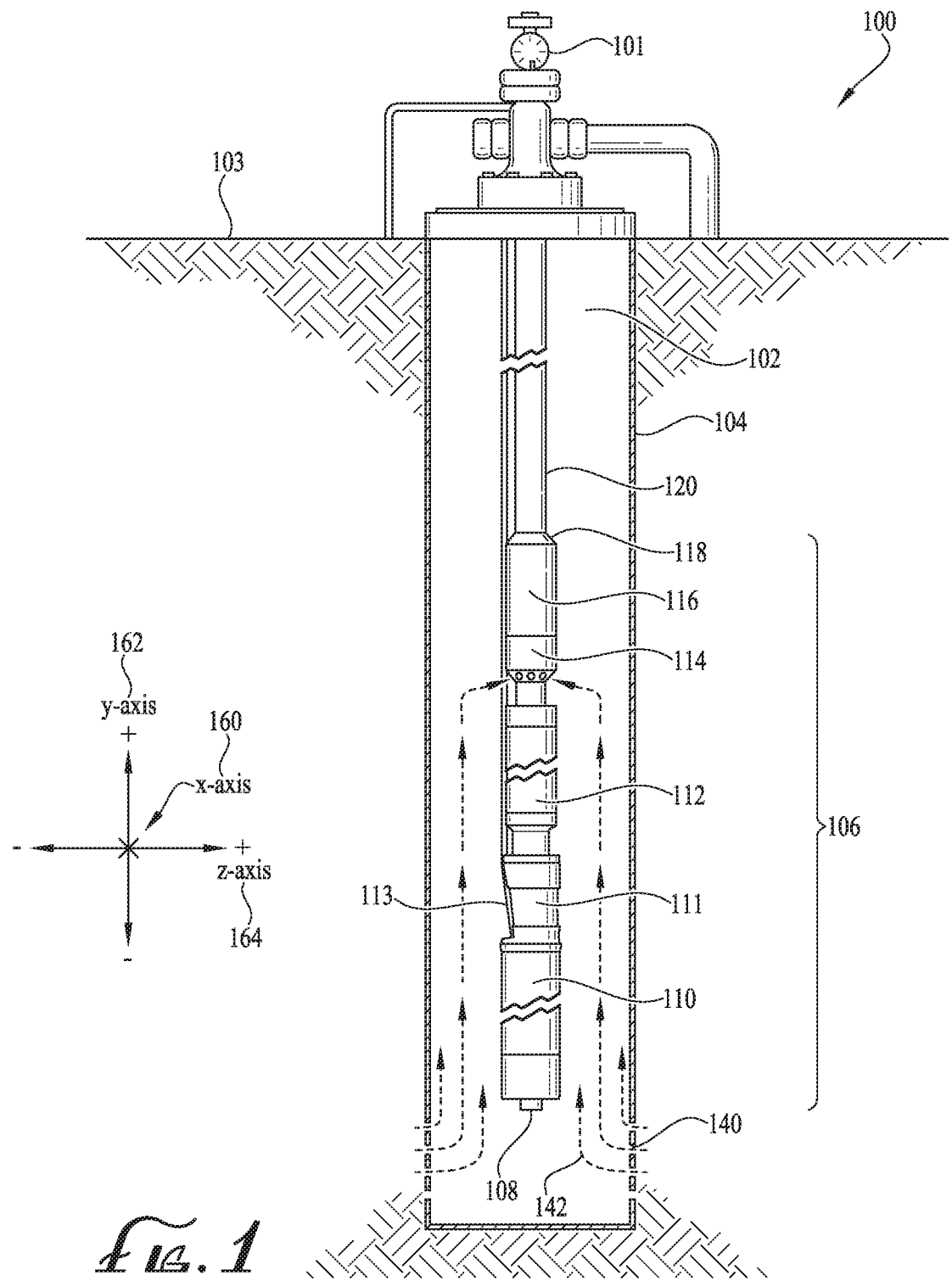
FIG. 1 is an illustration of an electric submersible pump (ESP) assembly disposed in a wellbore according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, orientation terms "upstream," "downstream," "up," and "down" are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid. "Down" is directed counter to the direction of flow of well fluid, towards the source of well fluid. "Up" is directed in the direction of flow of well fluid, away from the source of well fluid.

Rotating components of electric submersible pump (ESP) assemblies may be radially stabilized by radial bearings. As used herein, radially stabilizing rotating ESP components means maintaining a central axis of the rotating component substantially in coincidence with a central axis of surrounding static components of the ESP assembly. For example, radially stabilizing an electric motor means maintaining a central axis of a rotor of the electric motor substantially coincident with a central axis of a surrounding stator of the electric motor; radially stabilizing a centrifugal pump means maintaining a central axis of an impeller of the centrifugal pump substantially coincident with a central axis of a surrounding diffuser of the centrifugal pump. It is understood that radial stabilization includes some limited deviation between the central axes of the rotating components and of the surrounding static components. A hybrid magnetic radial bearing provides radial stabilization by both fluid film mechanical forces between a bearing surface of a sleeve portion and a bearing surface of a bushing portion of the hybrid magnetic radial bearing and magnetic forces between a magnetic component in the sleeve portion and a magnetic component in the bushing component of the hybrid magnetic radial bearing. The magnetic forces may be said to provide coarse radial stabilization while the fluid film mechanical force provides fine radial stabilization.

Rotating components of ESP assemblies generate axial thrust forces that may be supported by thrust bearings. A hybrid magnetic thrust bearing provides axial support to transfer axial thrust generated by rotating components of ESP assemblies to a housing of the ESP assembly. The hybrid magnetic thrust bearing provides axial support by both fluid film mechanical forces between a bearing surface of a thrust transfer plate and a bearing surface of a thrust support plate of the hybrid magnetic thrust bearing and magnetic forces between a magnetic component in the thrust transfer plate and a magnetic component in the thrust support plate of the hybrid magnetic thrust bearing.

Intense magnetic fields associated with electric motor rotors and stators may interfere with the magnetic forces provided by magnetic radial bearings, hybrid magnetic radial bearings, magnetic thrust bearings, and hybrid magnetic thrust bearings and may degrade the performance of these magnetic bearings and hybrid magnetic bearings. The present disclosure teaches providing magnetic shielding proximate to the components of the magnetic bearings and hybrid magnetic bearings that reduces the interference of magnetic fields generated by the rotor and/or stator of the electric motor with the magnetic fields of the magnetic bearings and the hybrid magnetic bearings. The magnetic shielding comprises electrical metal which has a high magnetic permeability that encourages the magnetic fields of the rotor and stator of an electric motor to pass through the magnetic shielding rather than through the magnetic bearing and the hybrid magnetic bearing. Said in other words, the magnetic shielding in a sense reroutes magnetic fields from the rotor and stator (that would otherwise impinge on the hybrid magnetic bearing) around the magnetic bearing and the hybrid magnetic bearing.

This magnetic shielding can improve the performance of a magnetic bearing and a hybrid magnetic bearing and thereby extend the operating life of the ESP assembly. Extending the life of the ESP assembly reduces operating costs of pulling, replacing, and resetting the ESP assembly in a wellbore. Extending the life of the ESP assembly further reduces production downtime, thereby increasing production of hydrocarbon or other fluids from a wellbore. It is understood that a magnetic bearing provides bearing supporting forces with opposing magnetic fields while a hybrid magnetic bearing provides bearing supporting forces with both opposing magnetic fields and by fluid film mechanical force.

Turning now to FIG. 1, a producing well environment 100 is described. In an embodiment, the environment 100 comprises a wellhead 101 above a wellbore 102 located at the surface 103. A casing 104 is provided within the wellbore 102. FIG. 1 provides a directional reference comprising three coordinate axes—an X-axis 160 where positive displacements along the X-axis 160 are directed into the sheet and negative displacements along the X-axis 160 are directed out of the sheet; a Y-axis 162 where positive displacements along the Y-axis 162 are directed upwards on the sheet and negative displacements along the Y-axis 162 are directed downwards on the sheet; and a Z-axis 164 where positive displacements along the Z-axis 164 are directed rightwards on the sheet and negative displacements along the Z-axis 164 are directed leftwards on the sheet. The Y-axis 162 is about parallel to a central axis of a vertical portion of the wellbore 102

An electric submersible pump (ESP) assembly 106 is deployed within the casing 104 and comprises an optional sensor unit 108, an electric motor 110, a motor head 111, a seal unit 112, an electric power cable 113, a pump intake 114, a centrifugal pump 116, and a pump outlet 118 that couples the pump 116 to a production tubing 120. The motor head 111 couples the electric motor 110 to the seal unit 112. The electric power cable 113 may connect to a source of electric power at the surface 103 and to the electric motor 110. The casing 104 is pierced by perforations 140, and reservoir fluid 142 flows through the perforations 140 into the wellbore 102. The fluid 142 flows downstream in an annulus formed between the casing 104 and the ESP assembly 106, is drawn into the pump intake 114, is pumped by the centrifugal pump 116, and is lifted through the production tubing 120 to the wellhead 101 to be produced at the surface 103. The fluid 142 may comprise hydrocarbons such as oil and/or gas. The fluid 142 may comprise water. The fluid 142 may comprise both hydrocarbons and water. In an embodiment, one or more of the electric motor 110, the seal unit 112, the centrifugal pump 116, or a gas separator (not shown) may be provided with hybrid magnetic radial bearings.

Figure 2A:
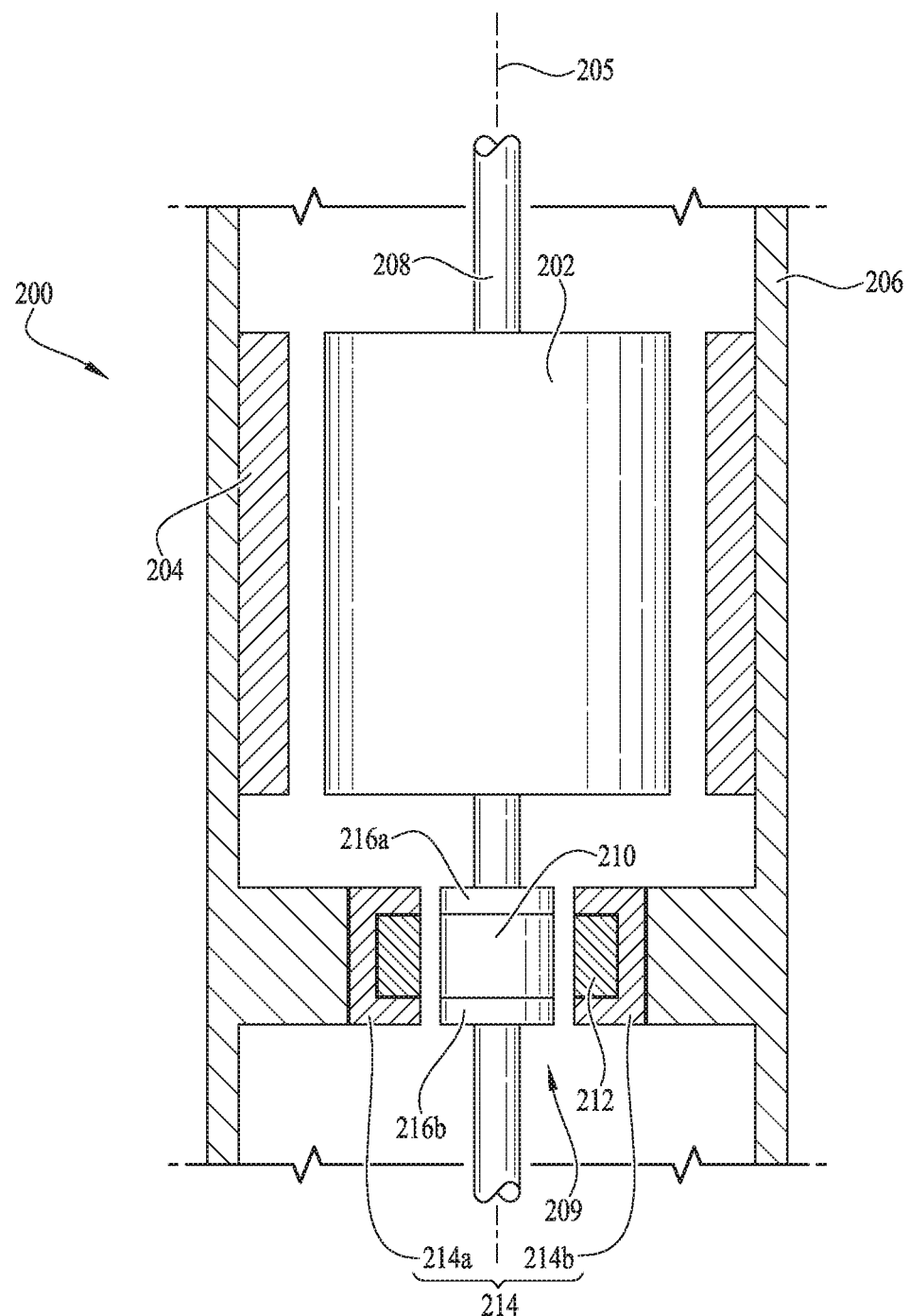
FIG. 2A is an illustration of a rotor of an electric motor radially stabilized by a hybrid magnetic radial bearing that is magnetically shielded according to an embodiment of the disclosure.

Turning now to FIG. 2A, an electric motor 200 radially stabilized by hybrid magnetic radial bearings is described. The motor 200 comprises a rotor 202, a stator 204, a housing 206, and a drive shaft 208 that the rotor 202 is coupled to. When the electric motor 200 operates it rotates, and the drive shaft 208 provides mechanical torque directly or indirectly to a centrifugal pump, such as centrifugal pump 116. The rotor 202 and drive shaft 208 have a center axis 205. The drive shaft 205, and hence the rotor 202 coupled to the drive shaft 205, is radially stabilized at least in part by a hybrid magnetic radial bearing 209 comprising a bearing sleeve 210 and a bearing bushing 212.

The bearing sleeve 210 is magnetically shielded from a magnetic field generated by the rotor 202 by a first sleeve magnetic shield 216a. In an embodiment, the electric motor 200 may comprise two or more rotor and stator pairs, such as a rotor and stator below the hybrid magnetic radial bearing 209. In this case, a second sleeve magnetic shield 216b magnetically shields the bearing sleeve 210 from a magnetic field generated by the rotor (not shown) located below the hybrid magnetic radial bearing 209. The bearing bushing 212 is magnetically shielded from a magnetic field generated by the stator 204 by a bushing magnetic shield 214 formed of mating first bushing magnetic shield component 214a and second bushing magnetic shield component 214b. The bushing magnetic shield 214 retains the hybrid magnetic radial bearing bushing 212. The bushing magnetic shield 214 is secured to the housing 206.

Figure 2B:
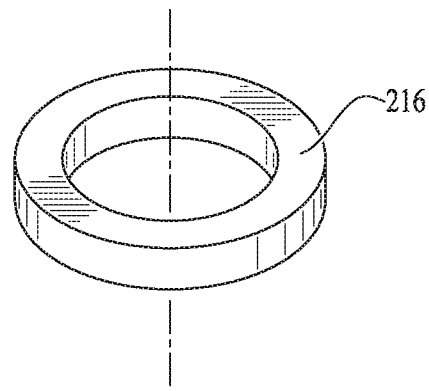
FIG. 2B is an illustration of a first magnetic shield according to an embodiment of the disclosure.

Turning now to FIG. 2B, the sleeve magnetic shield 216 is described. The sleeve magnetic shield 216 is secured to the drive shaft 208 adjacent the bearing sleeve 210 and is located between the bearing sleeve 210 and the rotor 202.

The sleeve magnetic shield 216 comprises electric metal having a moderate to high magnetic permeability, for example a relative permeability above 40,000 and less than 1,200,000 or a relative permeability above 40,000 and less than 300,000. The sleeve magnetic shield 216 may comprise a ferromagnetic material, like iron or iron alloys, Heusler alloys, or a nickel-iron alloy (e.g., permalloy). A Heusler alloy may comprise about two parts copper, one part manganese, and one part tin. In other Heusler alloys, the tin portion may be replaced by a corresponding portion of aluminum, arsenic, antimony, bismuth, or boron. In other Heusler alloys, the copper portion may be replaced by a corresponding portion of silver. The sleeve magnetic shield 216 may comprise mu-metal. Mu-metal typically comprises nickel, iron, and other components. One kind of mu-metal may comprise about 77% nickel, 16% iron, 5% copper, and 2% chromium. Another kind of mu-metal may comprise about 77% nickel, 16% iron, 5% copper, and 2% molybdenum. Another kind of mu-metal may comprise about 80% nickel, 12 to 15% iron, 5% molybdenum, and small amounts of other elements such as silicon. The sleeve magnetic shield 216 may comprise Hy Mu 80®. HyMu 80® comprises about 80% nickel, a maximum of about 4.2% molybdenum, a maximum of 0.5% manganese, a maximum of 0.35% silicon, a maximum of 0.02% carbon, and the balance of iron to make 100%. The sleeve magnetic shield 216 may comprise Alloy 49. Alloy 49 comprises a maximum of about 48% nickel, a maximum of about 0.5% manganese, a maximum of about 0.35% silicon, a maximum of about 0.02% carbon, and the balance of iron to make 100%. In an embodiment, the sleeve magnetic shield 216 may be a solid piece of electric metal. In an embodiment, the sleeve magnetic shield 216 may be composed of multiple laminations of electric metal. In an embodiment, the sleeve magnetic shield 216 may be formed of nanostructures. In an embodiment, the sleeve magnetic shield 216 may be composed of two or more different electric metals, for example two or more layers or laminations, where each layer or lamination may be a different electric metal.

Figure 2C:
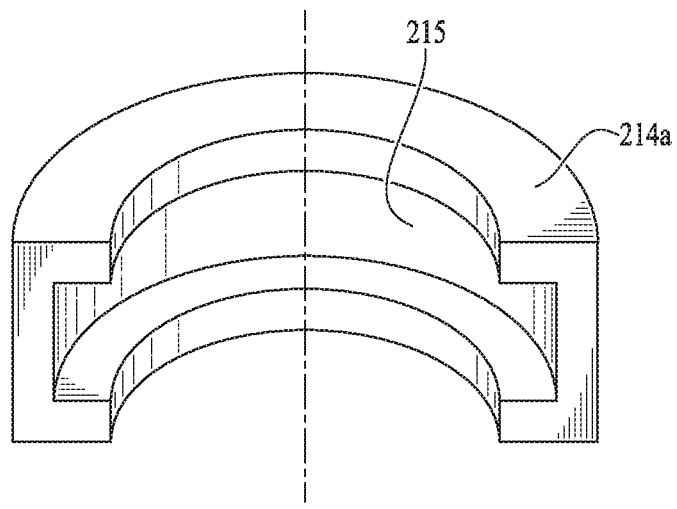
FIG. 2C is an illustration of a second magnetic shield according to an embodiment of the disclosure.

Turning now to FIG. 2C, the bushing magnetic shield 214*a* is described. In an embodiment the bushing magnetic shield 214 is formed from two substantially like bushing magnetic shields 214*a*, 214*b* that are assembled around the bearing bushing 212 during assembly of the electric motor 200. In another embodiment, however, the bushing magnetic shield 214 is formed from more than two bushing magnetic sleeve components that are combined during assembly to form an enclosure of the bearing bushing. The bushing magnetic shield 214*a* defines a groove 215 that is configured to receive the bearing bushing 212. In an embodiment, the bearing bushing 212 may be press fit into the groove 215. In an embodiment, the bearing bushing 212 may be secured in the groove 215 with attachment hardware. In an embodiment, the bearing bushing 212 may be secured in the groove 215 with glue, epoxy, or another adhesive and/or mechanically hled to prevent rotation. The bushing magnetic shield 214 is secured to the housing 206 of the electric motor 200. The bushing magnetic shield 214*a* is formed of electric metal having a moderate to high magnetic permeability, for example a relative permeability above 40,000 and less than 300,000. The electric metal used to make the bushing magnetic shield 214*a* may be any of the electric metals listed above as suitable for making the sleeve magnetic shield 216. The bushing magnetic shield 214*a* may be a solid piece. In an embodiment, the bushing magnetic shield 214*a* may be composed of multiple laminations of electric metal. In an embodiment, the bushing magnetic shield 214*a* may be formed of nanostructures. In an embodiment, the bushing magnetic shield 214*a* may be composed of two or more different electric metals, for example two or more layers or laminations, where each layer or lamination may be a different electric metal.

Figure 2D:
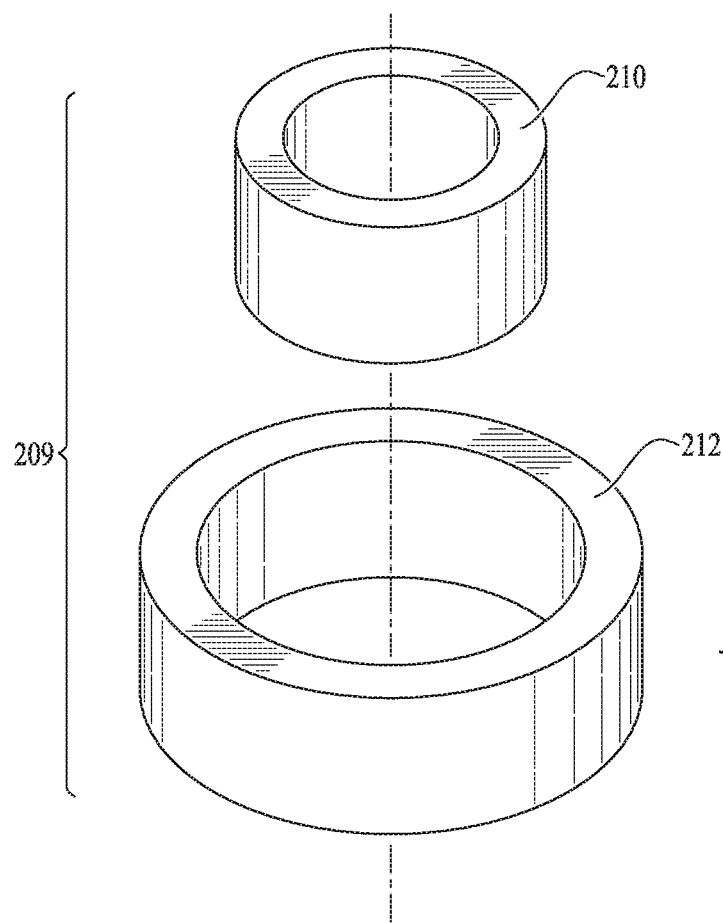
FIG. 2D is an illustration of a hybrid magnetic radial bearing according to an embodiment of the disclosure.
Figure 2E:
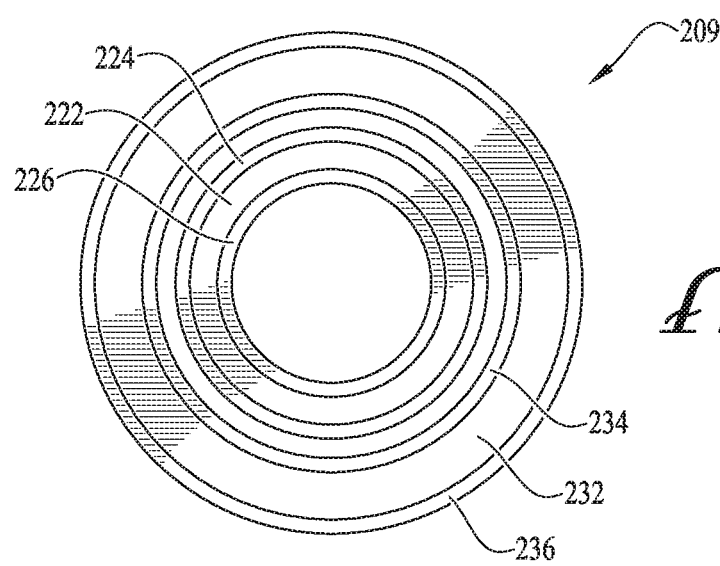
FIG. 2E is a cross-section of a hybrid magnetic radial bearing according to an embodiment of the disclosure.

Turning now to FIG. 2D and FIG. 2E, details of the hybrid magnetic radial bearing 209 are described. The bearing sleeve 210 fits within the bearing bushing 212. In an embodiment, the outside diameter of the bearing sleeve 210 may be about 1.5 inches, but in another embodiment, the outside diameter of the bearing sleeve 210 may be a different diameter. In an embodiment, the bearing sleeve 210 and the bearing bushing 212 are about 1.5 inches wide, but in other embodiments the bearing sleeve 210 and the bearing bushing 212 may have a different width.

In an embodiment, the bearing sleeve 210 comprises a sleeve magnetic element 222, an outer sleeve 224, and an inner sleeve 226. The sleeve magnetic element 222 may be said to be sandwiched between the outer sleeve 224 and the inner sleeve 226. The outer sleeve 224 may provide protection of the sleeve magnetic element 222 and provide a smooth bearing surface for providing fluid film mechanical forces. The outer sleeve 224 may allow magnetic flux of the sleeve magnetic element 222 to pass through it readily or with a low degree of attenuation or interference. In an embodiment, the outer sleeve 224 may be a coating that is applied to the sleeve magnetic element 222 during manufacturing (including but not limited to using an adaptive manufacturing process) of the bearing sleeve 210.

In an embodiment, the bearing bushing 212 comprises a bushing magnetic element 232, an inner sleeve 234, and an outer sleeve 236. The inner sleeve 234 may provide protection of the bushing magnetic element 232 and provide a smooth bearing surface for providing fluid film mechanical forces. The inner sleeve 234 may allow magnetic flux of the bushing magnetic element 232 to pass through it readily or with a low degree of attenuation or interference. In an embodiment, the inner sleeve 234 may be a coating that is applied to the bushing magnetic element 232 during manufacturing (including but not limited to using an adaptive manufacturing process) of the bearing bushing 212.

In an embodiment, the inside diameter of the bearing bushing 212 is about 3 mils to 10 mils greater in diameter than the outside diameter of the bearing sleeve 210. In another embodiment, however, the difference between the inside diameter of the bearing bushing 212 and the outside diameter of the bearing sleeve 210 may have a value outside the range of 3 mils to 10 mils. In an embodiment, the difference between the inside diameter of the bearing bushing 212 and the outside diameter of the bearing sleeve 210 is greater than the difference that would be seen in conventional journal-type bearings. It is observed that conventional radial bearings may have a gap of about 2 mils to 3 mils between the bearing bushing and the bearing sleeve. The greater separation between the bearing bushing 212 and the bearing sleeve 210 of the hybrid magnetic radial bearing 209 may provide some benefits of reduced wear in the presence of abrasive particles.

In an embodiment, the surface finish of the bearing bushing 212 and the bearing sleeve 210 may be about 20 millionths of an inch of surface variation. In an embodiment, the surface finish of the bearing bushing 212 and the bearing sleeve 210 have a roughness of between 8 micro inches and 22 micro inches. Said in other words, an outer surface of the sleeve 210 of the hybrid magnetic radial bearing 209 and an inner surface of the bushing 212 of the hybrid magnetic radial bearing 209 have a roughness of between 8 micro inches and 22 micro inches. It is noted that while the tolerance specification of surface finish may be relaxed for the surfaces of the bearing sleeve 210 and of the bearing bushing 212, the surface finish specification tolerance is not dispensed with but rather relaxed. A surface smoothness of 20 millionths of an inch of surface variation, for example, is relaxed with reference to conventional surfaces of bearings engineered for fluid film force exertion but is still a very smooth surface created by precise manufacturing processes.

Figure 2F:
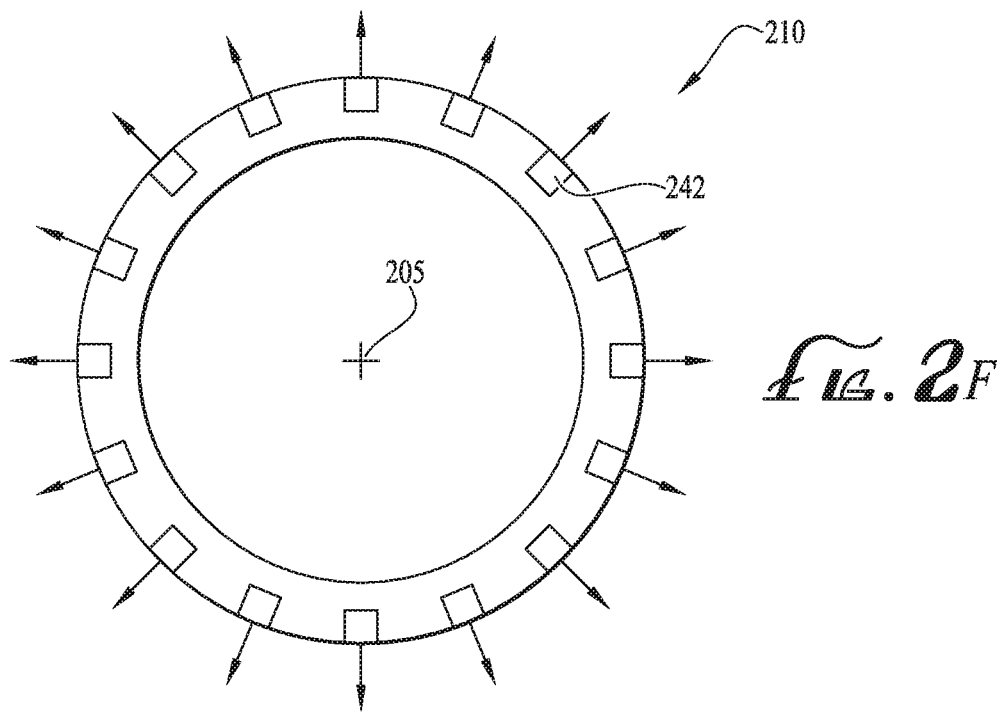
FIG. 2F is an illustration of a magnetic component of a hybrid magnetic radial bearing sleeve according to an embodiment of the disclosure.
Figure 2G:
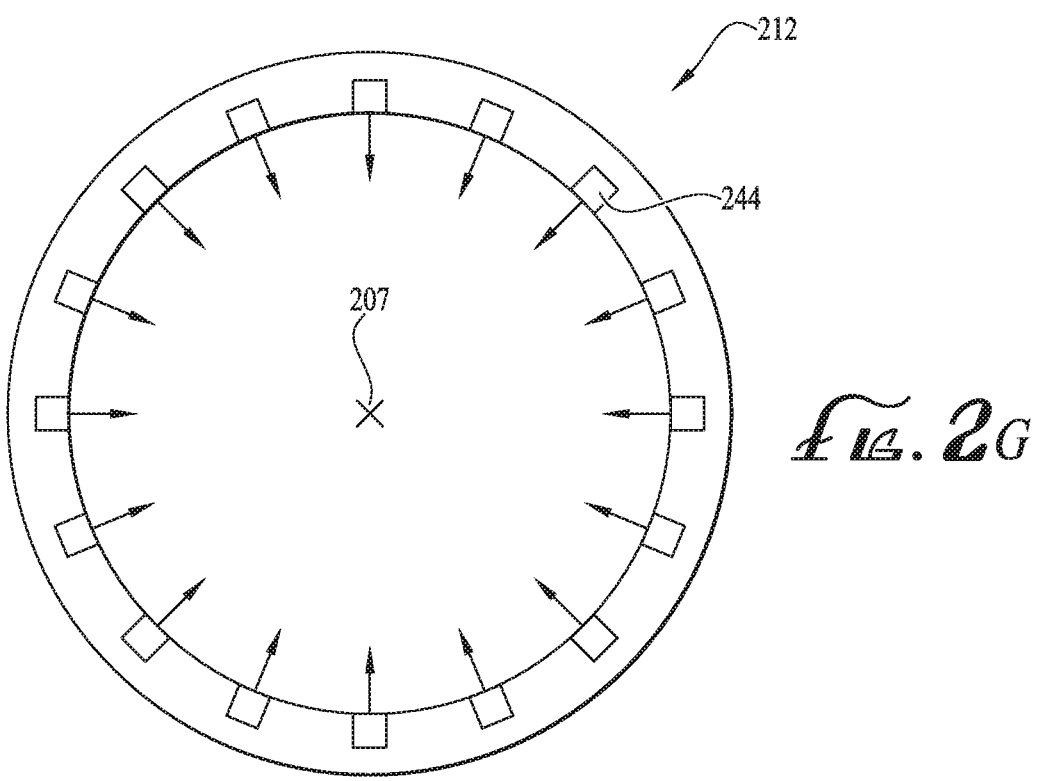
FIG. 2G is an illustration of a magnetic component of a hybrid magnetic radial bearing bushing according to an embodiment of the disclosure.

Turning now to FIG. 2F and FIG. 2G, further details of the hybrid magnetic radial bearing 209 are described. In an embodiment, the sleeve magnetic element 222 comprises a plurality of permanent magnets 242 with their field directed radially outwards (away from center axis 205) as indicated by arrows in FIG. 2F. In an embodiment, the permanent magnets 242 may be press fit into slots in the sleeve magnetic element 222. In an embodiment, the permanent magnets 242 may be secured with attachment hardware such as screws, brackets, retaining rings, or other attachment hardware. In an embodiment, the permanent magnets 242 may be secured with glue, epoxy, or another adhesive. In an embodiment, the permanent magnets 242 may all be disposed with their north magnetic field directed radially outwards (away from center axis 205) or may all be disposed with their south magnetic field directed radially outwards (away from center axis 205). While illustrated in FIG. 2F as rectangular in shape, the permanent magnets 242 may take on a variety of different form factors. The permanent magnets 242 may be circular cylinders. The permanent magnets 242 may be triangular cylinders.

Turning now to FIG. 2G, further details of the bushing magnetic element 232 are described. In an embodiment, the bushing magnetic element 232 comprises a plurality of permanent magnets 244 with their field directed radially inwards (towards center axis 207) as indicated by arrows in FIG. 2G. In an embodiment, the permanent magnets 244 may be press fit into slots in the bushing magnetic element 232. In an embodiment, the permanent magnets 244 may be secured with attachment hardware such as screws, brackets, retaining rings, or other attachment hardware. In an embodiment, the permanent magnets 244 may be secured with glue, epoxy, or another adhesive. In an embodiment, the permanent magnets 244 may all be disposed with their north magnetic field directed radially inwards (towards center axis 207) or may all be disposed with their south magnetic field directed radially inwards (towards center axis 207). In an embodiment where the permanent magnets 242 are disposed with their north magnetic fields directed radially outwards (away from center axis 205), the permanent magnets 244 of that embodiment are disposed with their north magnetic fields directed radially inwards (towards center axis 207, which may be substantially coincident with center axis 205). In an embodiment where the permanent magnets 242 are disposed with their south magnetic fields directed radially outwards (away from center axis 205), in that embodiment the permanent magnets 244 are disposed with their south magnetic fields directed radially inwards (towards center axis 207, which may be substantially coincident with center axis 205). Because like poles of permanent magnets repel, forces between the permanent magnets 242 and the permanent magnets 244 operate to urge the sleeve magnetic element 222 and the bearing sleeve 210 to move so that the center axis 205 of the bearing sleeve 210 coincides with the center axis 207 of the bearing bushing 212. While illustrated in FIG. 2G as rectangular in shape, the permanent magnets 244 may take on a variety of different form factors. The permanent magnets 244 may be circular cylinders. The permanent magnets 244 may be triangular cylinders.

With reference to both FIG. 2F and FIG. 2G, in an embodiment the permanent magnets 242, 244 are rare earth permanent magnets. In an embodiment, the permanent magnets 242, 244 are samarium-cobalt rare earth permanent magnets. In an embodiment, the permanent magnets 242, 244 are neodymium rare earth permanent magnets. Samarium-cobalt rare earth permanent magnets may retain desirable magnetic properties better than neodymium rare earth permanent magnets in a high temperature downhole environment. Neodymium rare earth permanent magnets may provide higher magnetic force than samarium-cobalt rare earth permanent magnets when they are used in a moderate temperature downhole environment.

The permanent magnets 242, 244 produce a substantially constant magnetic field strength and may be referred to as passive magnets in contrast to other magnetic devices (e.g., an electro magnet) that may produce a controllable magnetic field strength. The permanent magnets 242, 244 may be fixed in place and can further be distinguished from permanent magnets whose position may be dynamically controlled by a feedback control loop type of control system. For this reason, in some contexts, the hybrid magnetic radial bearings taught herein may be referred to as passive hybrid magnetic radial bearings.

Figure 3A:
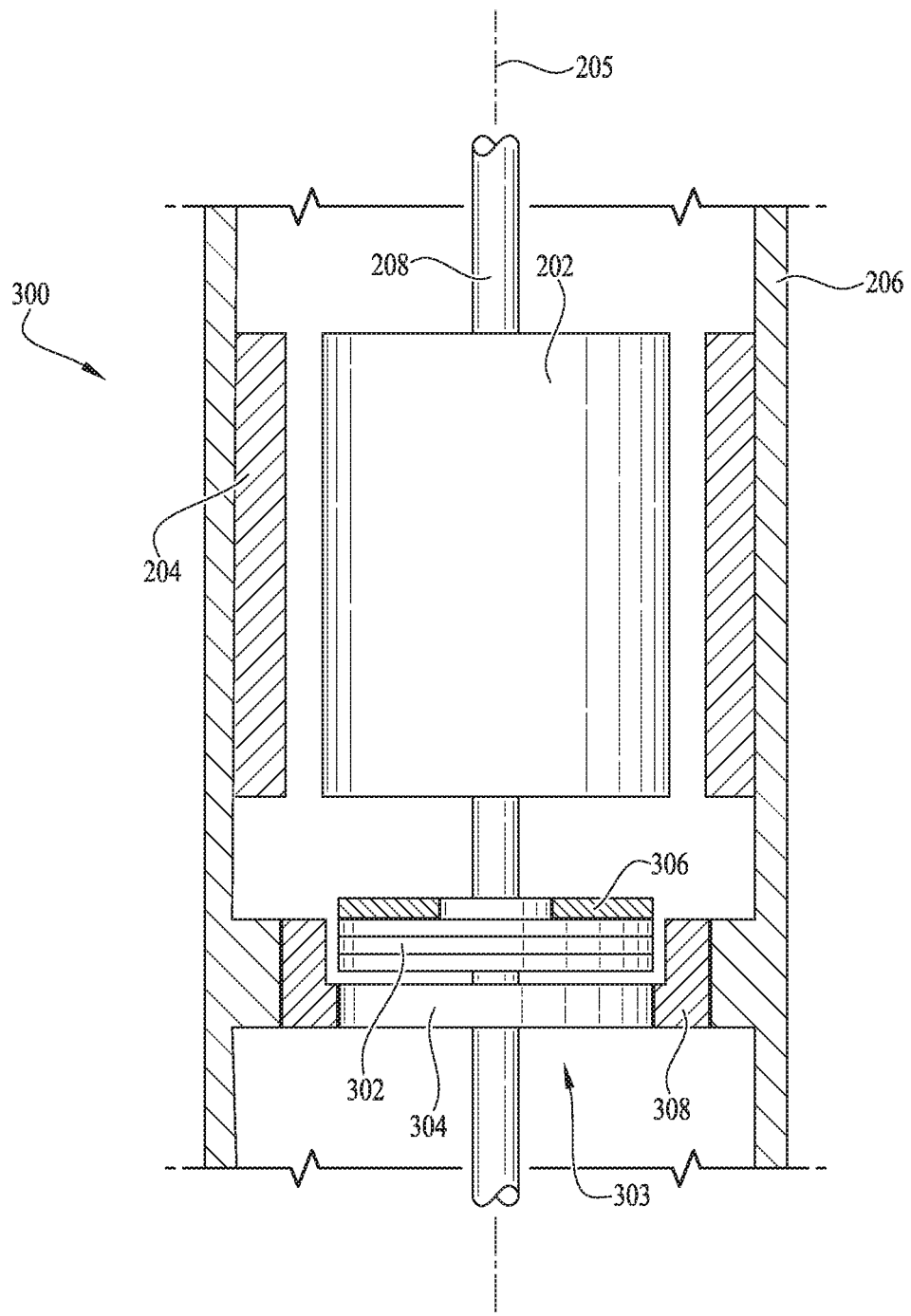
FIG. 3A is an illustration of a rotor of an electric motor axially stabilized by a hybrid magnetic thrust bearing that is magnetically shielded according to an embodiment of the disclosure.

Turning now to FIG. 3A, the electric motor 200 is shown axially supported by a hybrid magnetic thrust bearing 303. It is understood that the electric motor 200 illustrated in FIG. 3A may be configured with one or more hybrid magnetic radial bearings 209 as described above with reference to FIG. 2A, FIG. 2B, FIG. 2C, FIG. 2D, FIG. 2E, FIG. 2F, and FIG. 2G. The hybrid magnetic thrust bearing 303 comprises a thrust transfer plate 302 and a thrust support plate 304. The thrust transfer plate 302 may be coupled to and rotate with the drive shaft 208. The thrust transfer plate 302 is surmounted by a first thrust bearing magnetic shield 306. The outer edge of the thrust transfer plate 302 and the outer edge of the thrust support plate 304 are surrounded by a second thrust bearing magnetic shield 308. The second thrust bearing magnetic shield 308 secures and holds the thrust support plate 304. The second thrust bearing magnetic shield 308 is secured to the housing 206 of the electric motor.

Figure 3B:
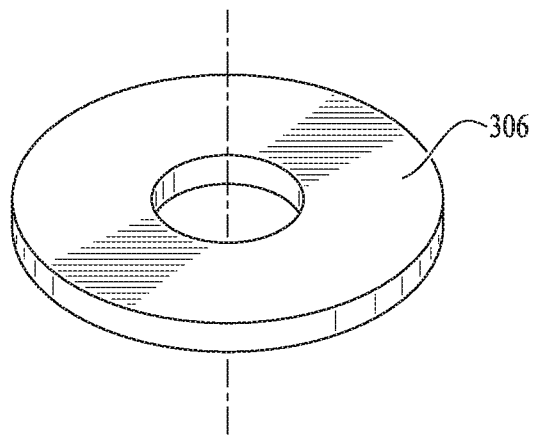
FIG. 3B is an illustration of a third magnetic shield according to an embodiment of the disclosure.

Turning now to FIG. 3B, the first thrust bearing magnetic shield 306 is described in further detail. The first thrust bearing magnetic shield 306 is formed of electric metal having moderate to high magnetic permeability, for example a relative permeability above 40,000 and less than 300,000. See the descriptions of electric metals and different examples of electric metals described above. Any of those materials may be used to build the first thrust bearing magnetic shield 306. In an embodiment, the first thrust bearing magnetic shield 306 may be a solid piece of electric metal. In an embodiment, the first thrust bearing magnetic shield 306 may be formed of laminations of electric metal. The first thrust bearing magnetic shield 306 may be secured to a collar of the thrust transfer plate 302 of the magnetic thrust bearing 303. The first thrust bearing magnetic shield 306 may be press fit over an outside of a collar or shoulder of the thrust transfer plate 302. The first thrust bearing magnetic shield 306 is located between the thrust transfer plate 302 and the rotor 202.

Figure 3C:
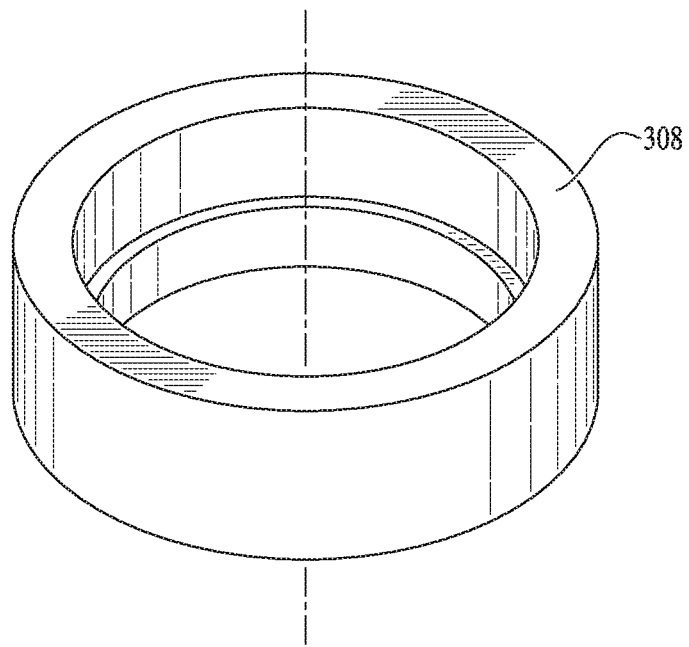
FIG. 3C is an illustration of a fourth magnetic shield according to an embodiment of the disclosure.

Turning now to FIG. 3C, the second thrust bearing magnetic shield 308 is described in further detail. The second thrust bearing magnetic shield 308 is formed of electric metal having moderate to high magnetic permeability, for example a relative permeability above 40,000 and less than 300,000. See the descriptions of electric metals and different examples of electric metals described above. Any of those materials may be used to build the second thrust bearing magnetic shield 308. In an embodiment, the second thrust bearing magnetic shield 308 may be a solid piece of electric metal. In an embodiment, the second thrust bearing magnetic shield 308 may be formed of laminations of electric metal. The second thrust bearing magnetic shield 308 may be press fit over an outside of the thrust support plate 302 and secures the thrust support plate 302. The second thrust bearing magnetic shield 308 may be press fit into the housing 206.

Figure 3D:
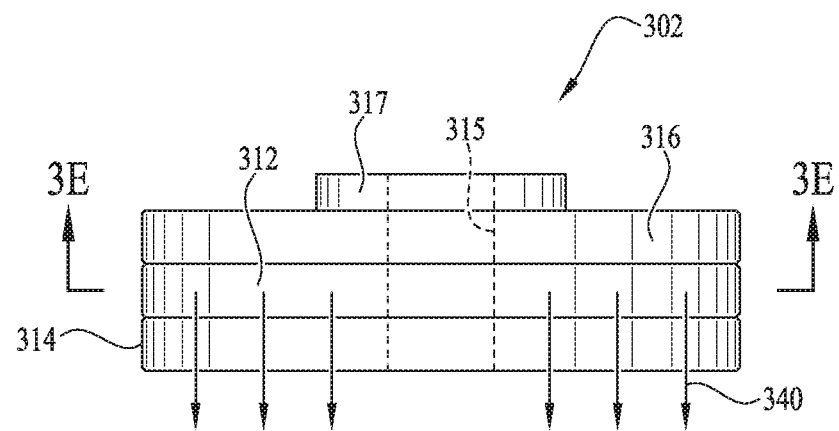
FIG. 3D is an illustration of a hybrid magnetic thrust bearing thrust transfer plate according to an embodiment of the disclosure.

Turning now to FIG. 3D, details of the thrust transfer plate 302 are described. In an embodiment, the thrust transfer plate 302 comprises a thrust transfer plate magnetic element 312, a bearing surface 314, and a support plate 316 having a shoulder 317. The thrust transfer plate 302 defines a through-hole 315 to accommodate the drive shaft 208. The shoulder 317 may be used to secure the thrust transfer plate 302 to the drift shaft 208 and to stabilize the thrust transfer plate 302. The magnetic element 312 produces a magnetic field 340.

Figure 3E:
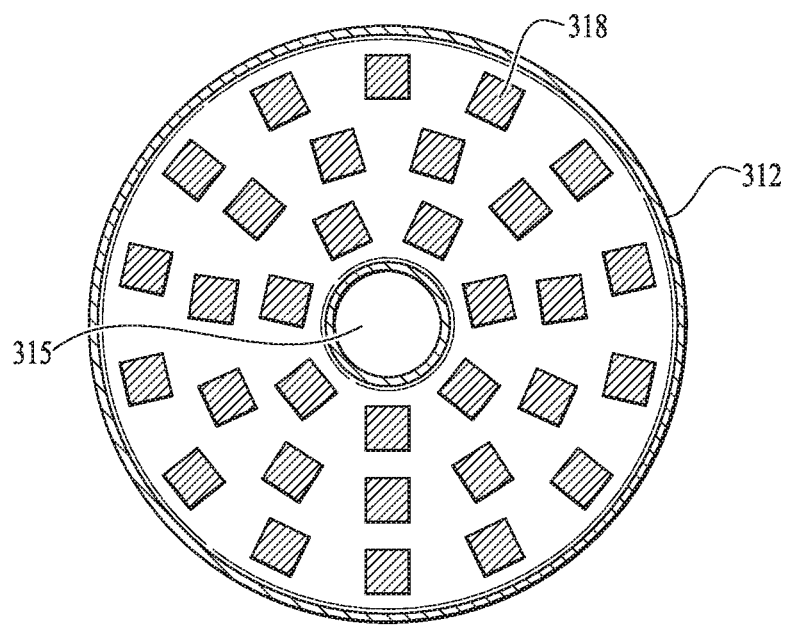
FIG. 3E is an illustration of a magnetic component of a hybrid magnetic thrust bearing thrust transfer plate according to an embodiment of the disclosure.

Turning now to FIG. 3E, a cross-section of the magnetic element 312 is described. In an embodiment, the magnetic element 312 comprises a plurality of permanent magnets 318. In an embodiment, the permanent magnets 318 may be press fit into slots in the magnetic element 312. In an embodiment, the permanent magnets 318 may be secured with attachment hardware such as screws, brackets, retaining rings, or other attachment hardware. In an embodiment, the permanent magnets 318 may be secured with glue, epoxy, or other adhesive. The permanent magnets 318 are each positioned with their magnetic fields oriented in the same direction, for example with their north magnetic poles directed towards the bearing surface 314 or with their south magnetic poles directed towards the bearing surface 314.

Figure 3F:
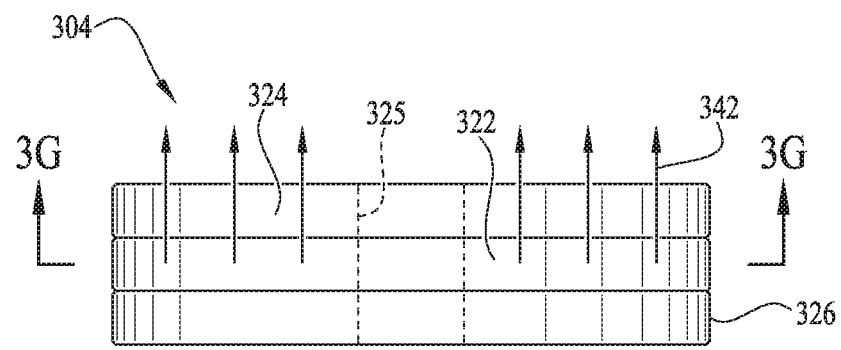
FIG. 3F is an illustration of a hybrid magnetic thrust bearing thrust support plate according to an embodiment of the disclosure.

Turning now to FIG. 3F, details of the thrust support plate 304 are described. In an embodiment, the thrust support plate 304 comprises a thrust support plate magnetic element 322, a bearing surface 324, and a support plate 326. The thrust support plate 304 defines a through-hole 325 to accommodate the drive shaft 208. The magnetic element 322 produces a magnetic field 342.

Figure 3G:
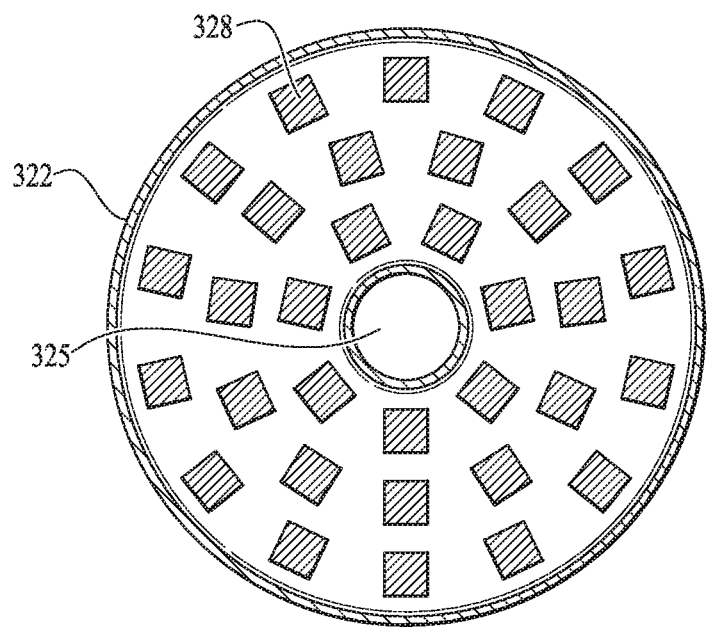
FIG. 3G is an illustration of a magnetic component of a hybrid magnetic thrust bearing thrust support plate according to an embodiment of the disclosure.

Turning now to FIG. 3G, a cross-section of the magnetic element 322 is described. In an embodiment, the magnetic element 322 comprises a plurality of permanent magnets 328. In an embodiment, the permanent magnets 328 may be press fit into slots in the magnetic element 322. In an embodiment, the permanent magnets 328 may be secured with attachment hardware such as screws, brackets, retaining rings, or other attachment hardware. In an embodiment, the permanent magnets 328 may be secured with glue, epoxy, or other adhesive. The permanent magnets 328 are each positioned with their magnetic fields oriented in the same direction, for example with their north magnetic poles directed toward the bearing surface 324 or with their south magnetic poles directed toward the bearing surface 324. If the north magnetic fields of the permanent magnets 318 are directed toward the bearing surface 314, the north magnetic fields of the permanent magnets 328 are directed toward the bearing surface 324. If the south magnetic fields of the permanent magnets 318 are directed toward the bearing surface 314, the south magnetic fields of the permanent magnets 328 are directed toward the bearing surface 324. In this way, the fields of the permanent magnets 318 are directed contrary to the fields of the permanent magnets 328.

Figure 3H:
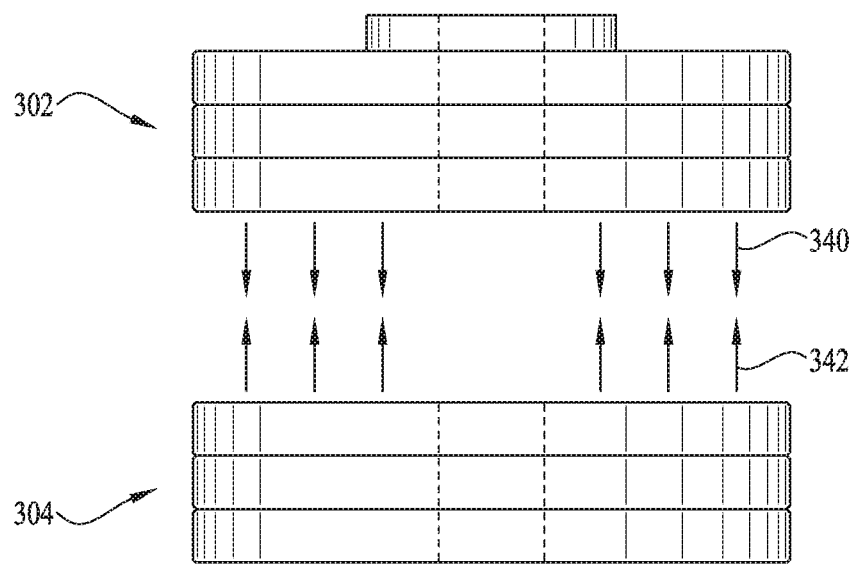
FIG. 3H is an illustration of opposing magnetic fields of a hybrid magnetic thrust bearing thrust transfer plate and a hybrid magnetic thrust bearing thrust support plate according to an embodiment of the disclosure.

Turning now to FIG. 3H, the relationship between magnetic fields 340 produced by the thrust transfer plate 302 and magnetic fields 342 produced by the thrust support plate 304 is discussed. The magnetic fields 340, 342 are directed to oppose each other and to thereby produce a force of opposition between the magnetic elements 312, 322. This force is inversely related to the distance between the magnetic elements 312, 322. As a separation between the thrust transfer plate 302 and the thrust support plate 304 is decreased, the opposing force developed between the magnetic elements 312, 322 increases, and as the separation between the thrust transfer plate 302 and the thrust support plate 304 is increased, the opposing force developed between the magnetic elements 312, 322 decreases.

With reference now to FIG. 3D, FIG. 3E, FIG. 3F, and FIG. 3G, in an embodiment the permanent magnets 318, 328 are rare earth permanent magnets. In an embodiment, the permanent magnets 318, 328 are samarium-cobalt rare earth permanent magnets. In an embodiment, the permanent magnets 318, 328 are neodymium rare earth permanent magnets. Samarium-cobalt rare earth magnets may retain desirable magnetic properties better than neodymium rare earth magnets in a high temperature downhole environment. Neodymium rare earth magnets may provide higher magnetic force than samarium-cobalt rare earth magnets when they are used in a moderate temperature downhole environment. The permanent magnets 318, 328 produce a substantially constant magnetic field strength and may be referred to as passive magnets in contrast to other magnetic devices (e.g., an electro magnet) that may produce a controllable magnetic field strength or where the position of the magnets may be controlled by a feedback control loop (e.g., active control system). For this reason, in some contexts, the hybrid magnetic radial bearings taught herein may be referred to as passive hybrid magnetic radial bearings.

With reference to FIG. 3A, FIG. 3D FIG. 3E, FIG. 3F, FIG. 3G, and FIG. 3H, the hybrid magnetic thrust bearing 303 supports axial thrust with fluid film mechanical forces operating between the bearing surfaces 314, 324 augmented by magnetic forces operating between the opposing magnetic fields 340, 342. The contribution of the magnetic forces may permit some of the tolerances of the bearing surfaces 314, 324 to be relaxed, whereby manufacturing costs may be reduced. Additionally, the contribution of the magnetic forces to the fluid film mechanical forces in the hybrid magnetic thrust bearing 303 may promote maintaining a greater separation between the bearing surfaces 314, 324 which can reduce bearing surface wear in the presence of abrasive particles.

The hybrid magnetic thrust bearing 303 can be installed with a first orientation (in the orientation illustrated in FIG. 3A) in the ESP assembly 106 to support thrust force directed axially downwards, for example thrust force transferred by the drive shaft 208 directed axially downwards. When the hybrid magnetic thrust bearing 303 is installed in the electric motor 200 (e.g., in the electric motor 110 of the ESP assembly 106) in the first orientation, the hybrid magnetic thrust bearing 303 may be said to exert magnetic force on a rotating component (e.g., the drive shaft 208) directed axially upwards along center axis 205 and to exert fluid film mechanical force on the rotating component directed axially upwards along the center axis 205. The electric motor 200 may be said to be axially supported by magnetic force applied by the magnetic elements 312, 322 (e.g., magnetic force developed by the opposing magnetic fields 340, 342 repelling each other) and by fluid film force applied between the bearing surface 314 of the thrust transfer plate 302 and the bearing surface 324 of the thrust support plate 304 of the hybrid magnetic thrust bearing 303 disposed in the first orientation.

The hybrid magnetic thrust bearing 303 can be installed with a second orientation (the orientation of FIG. 3A rotated 180 degrees—e.g., 'flipped') in the ESP assembly 106 to support thrust force directed axially upwards, for example thrust force transferred by the drive shaft 208 directed axially upwards along the center axis 205. When the hybrid magnetic thrust bearing 303 is installed in the electric motor 200 in the second orientation, the hybrid magnetic thrust bearing 303 may be said to exert magnetic force on the drive shaft 208 directed axially downwards parallel to the central axis 205 and to exert fluid film mechanical force on the drive shaft 205 directed axially downwards parallel to the central axis 205. The electric motor 200 can be said to be axially supported by magnetic force applied by the magnetic elements 212, 322 (e.g., magnetic force developed by the opposing magnetic fields 340, 342 repelling each other) and by fluid film force applied between the bearing surface 314 of the thrust transfer plate 302 and the bearing surface 324 of the thrust support plate 304 of the hybrid magnetic thrust bearing 303 disposed in the first orientation.

In an embodiment, a separation between the bearing surfaces 314, 324 is about 3 mils to 10 mils. In another embodiment, however, the separation between the bearing surfaces 314, 324 may have a value outside the range of 3 mils to 10 mils. In an embodiment, the separation between the bearing surfaces 314, 324 is greater than the separation maintained in conventional thrust bearings. The surface roughness of the bearing surfaces 314, 324 may be about 20 millionths of an inch of surface variation, while conventional thrust bearings may have a surface roughness of about 10 millionths of an inch in surface variation. In an embodiment, the surface finish of the bearing surfaces 314, 324 have a roughness of between 8 micro inches and 22 micro inches.

Turning now to FIG. 4, a method 400 is described. In an embodiment, the method 400 is a method of radially stabilizing in an electric submersible pump (ESP) assembly, for example the ESP assembly 106 illustrated and described with reference to FIG. 1. At block 402, the method 400 comprises providing electric power to an electric motor of an ESP assembly disposed in a wellbore, for example the electric motor 110, 200. At block 404, the method 400 comprises stabilizing the electric motor by exerting magnetic force on the electric motor. At block 406, the method 400 comprises shielding a magnetic field associated with the stabilizing magnetic force from a magnetic field produced by the electric motor.

Figure 5:
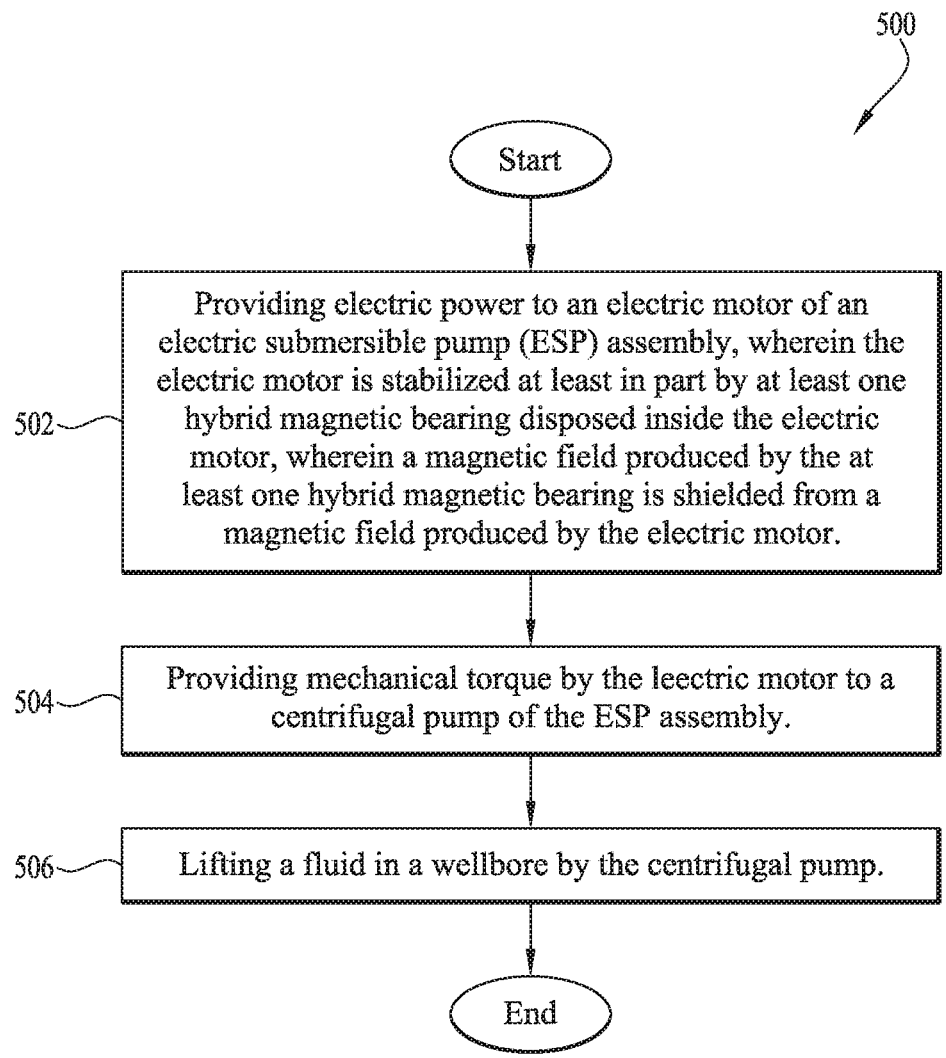
FIG. 5 is a flow chart of another method according to an embodiment of the disclosure.

Turning now to FIG. 5, a method 500 is described. In an embodiment, the method 500 is a method of lifting fluid in a wellbore, for example lifting fluid 142 in the wellbore 102. At block 502, the method 500 comprises providing electric power to an electric motor of an electric submersible pump (ESP) assembly, wherein the electric motor is stabilized at least in part by at least one bearing disposed inside the electric motor, wherein a magnetic field produced by the at least one bearing is shielded from a magnetic field produced by the electric motor. For example electric power is provided to the electric motor 110, 200. In an embodiment, the bearing is a magnetic bearing. In another embodiment, the bearing is a hybrid magnetic bearing. At block 504, the method 500 comprises providing mechanical torque by the electric motor to a centrifugal pump of the ESP assembly. For example, the electric motor 110, 200 provides mechanical torque to the centrifugal pump 116. At block 506, the method 500 comprises lifting a fluid in a wellbore by the centrifugal pump. For example, the ESP assembly 106 and/or the centrifugal pump 116, responsive to mechanical torque provided by the electric motor 110, 200, lifts fluid 142 in the wellbore 102 to the surface 103 at the wellhead 101.

ADDITIONAL DISCLOSURE

The following are non-limiting, specific embodiments in accordance with the present disclosure:

A first embodiment, which is an electric submersible pump (ESP) assembly, comprising a centrifugal pump, an electric motor mechanically coupled by a drive shaft to the centrifugal pump, wherein the electric motor comprises a stator and a rotor, a bearing, wherein the bearing is disposed inside the electric motor, and a magnetic shield disposed in the electric motor between the bearing and the rotor and stator.

A second embodiment, which is the ESP assembly of the first embodiment, wherein the bearing is a hybrid magnetic radial bearing.

A third embodiment, which is the ESP assembly of the second embodiment, wherein the magnetic shield comprises a sleeve magnetic shield and a bushing magnetic shield.

A fourth embodiment, which is the ESP assembly of the third embodiment, wherein the sleeve magnetic shield is secured to the drive shaft and between a sleeve of the hybrid magnetic radial bearing and the rotor and wherein the bushing magnetic shield is secured to a housing of the electric motor and retains a bushing of the hybrid magnetic radial bearing in a groove defined by the bushing magnetic shield.

A fifth embodiment, which is the ESP assembly of any of the second, the third, or the fourth embodiment, further comprising a hybrid magnetic thrust bearing disposed in the electric motor, and a second magnetic shield disposed in the electric motor between the hybrid magnetic thrust bearing and the rotor and stator.

A sixth embodiment, which is the ESP assembly of the first embodiment, wherein the bearing is a hybrid magnetic thrust bearing.

A seventh embodiment, which is the ESP assembly of the sixth embodiment, wherein the magnetic shield comprises a first thrust bearing magnetic shield and a second thrust bearing magnetic shield.

An eighth embodiment, which is the ESP assembly of the seventh embodiment, wherein the first thrust bearing magnetic shield is secured to a collar of a thrust transfer plate of the hybrid magnetic thrust bearing and the first thrust bearing magnetic shield is located between the thrust transfer plate and the rotor and wherein the second thrust bearing magnetic shield is secured to a housing of the electric motor and secures a thrust support plate of the hybrid magnetic thrust bearing.

A ninth embodiment, which is the ESP assembly of any of the first, the second, the third, the fourth, the fifth, the sixth, the seventh, or the eighth embodiment, wherein the electromagnetic shield comprises electric metal having a relative magnetic permeability in the range of 40,000 to 300,000.

A tenth embodiment, which is a method of stabilizing in an electric submersible pump (ESP) assembly, comprising providing electric power to an electric motor of an ESP assembly disposed in a wellbore, stabilizing the electric motor by exerting magnetic force on the electric motor, and shielding a magnetic field associated with the stabilizing magnetic force from a magnetic field produced by the electric motor.

An eleventh embodiment, which is the method of the tenth embodiment, wherein the magnetic force stabilizes the electric motor radially.

A twelfth embodiment, which is the method of the eleventh embodiment, wherein the magnetic force stabilizes the electric motor axially.

A thirteenth embodiment, which is a method of lifting fluid in a wellbore, comprising providing electric power to an electric motor of an electric submersible pump (ESP) assembly, wherein the electric motor is stabilized at least in part by at least one hybrid magnetic bearing disposed inside the electric motor, wherein a magnetic field produced by the at least one hybrid magnetic bearing is shielded from a magnetic field produced by the electric motor, providing mechanical torque by the electric motor to a centrifugal pump of the ESP assembly, and lifting a fluid in a wellbore by the centrifugal pump.

A fourteenth embodiment, which is the method of the thirteenth embodiment, wherein the at least one hybrid magnetic bearing comprises a hybrid magnetic radial bearing that radially stabilizes the electric motor at least in part.

A fifteenth embodiment, which is the method of the thirteenth embodiment, wherein the at least one hybrid magnetic bearing comprises a hybrid magnetic thrust bearing that axially stabilizes the electric motor at least in part.

A sixteenth embodiment, which is the method of the thirteenth embodiment, wherein the at least one hybrid magnetic bearing comprises a hybrid magnetic radial bearing that radially stabilizes the electric motor at least in part and comprises a hybrid magnetic thrust bearing that axially stabilizes the electric motor at least in part.

A seventeenth embodiment, which is the method of any of the thirteenth or the fifteenth embodiment, wherein the at least one hybrid magnetic bearing comprises two hybrid magnetic radial bearings that radially stabilize the electric motor at least in part and comprises a hybrid magnetic thrust bearing that axially stabilizes the electric motor at least in part.

An eighteenth embodiment, which is the method of any of the thirteenth, the fourteenth, the fifteenth, the sixteenth, or the seventeenth embodiment, wherein the at least one hybrid magnetic bearing is shielded from a magnetic field produced by the electric motor by a magnetic shield comprising electric metal having a magnetic relative permeability in the range of 40,000 to 300,000.

A nineteenth embodiment, which is the method of the eighteenth embodiment, wherein the electric metal comprises a Heusler alloy or a nickel-iron alloy.

A twentieth embodiment, which is the method of the eighteenth embodiment, wherein the electric metal comprises mu-metal.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electric submersible pump (ESP) assembly, comprising:
   a centrifugal pump;
   an electric motor mechanically coupled by a drive shaft to the centrifugal pump, wherein the electric motor comprises a stator and a rotor;
   a bearing, wherein the bearing is disposed inside the electric motor and the bearing is a hybrid magnetic radial bearing; and
   a magnetic shield disposed in the electric motor between the bearing and the rotor and stator, wherein the magnetic shield comprises a sleeve magnetic shield and a bushing magnetic shield, wherein the sleeve magnetic shield is secured to the drive shaft and between a sleeve of the hybrid magnetic radial bearing and the rotor and wherein the bushing magnetic shield is secured to a housing of the electric motor and retains a bushing of the hybrid magnetic radial bearing in a groove defined by the bushing magnetic shield.

2. The ESP assembly of claim 1, further comprising:
   a hybrid magnetic thrust bearing disposed in the electric motor; and
   a second magnetic shield disposed in the electric motor between the hybrid magnetic thrust bearing and the rotor and stator.

3. The ESP assembly of claim 1, wherein the magnetic shield comprises electric metal having a relative magnetic permeability in the range of 40,000 to 300,000.

4. The ESP assembly of claim 1, wherein the bushing magnetic shield comprises two bushing magnetic shield components assembled around the bushing of the hybrid magnetic radial bearing.

5. The ESP assembly of claim 1, wherein an outer surface of the sleeve of the hybrid magnetic radial bearing and an inner surface of the bushing of the hybrid magnetic radial bearing have a surface roughness of between 14 micro inches and 22 micro inches.

6. The ESP assembly of claim 1, wherein the sleeve of the hybrid magnetic radial bearing comprises a plurality of permanent magnets and the bushing of the hybrid magnetic radial bearing comprises a plurality of permanent magnets.

7. The ESP assembly of claim 6, wherein the permanent magnets of the sleeve of the hybrid magnetic radial bearing and the permanent magnets of the bushing of the hybrid magnetic bearing comprise rare earth permanent magnets.

8. The ESP assembly of claim 2, wherein the hybrid magnetic thrust bearing comprises a thrust transfer plate and a thrust support plate, wherein a bearing surface of the thrust transfer plate has a surface finish having a roughness between 14 micro inches and 22 micro inches and a bearing surface of the thrust support plate has a surface finish having a roughness between 14 micro inches and 22 micro inches.

9. The ESP assembly of claim 8, wherein the thrust transfer plate comprises a plurality of permanent magnets and the thrust support plate comprises a plurality of permanent magnets.

10. The ESP assembly of claim 9, wherein the permanent magnets of the thrust transfer plate and the permanent magnets of the thrust support plate comprise rare earth permanent magnets.

11. A method of stabilizing in an electric submersible pump (ESP) assembly, comprising:
providing electric power to an electric motor of an ESP assembly disposed in a wellbore;
stabilizing the electric motor at least in part by at least one hybrid magnetic radial bearing disposed inside the electric motor exerting magnetic force on the electric motor; and
shielding a magnetic field associated with the stabilizing magnetic force at least one hybrid magnetic radial bearing from a magnetic field produced by the electric motor using a magnetic shield disposed in the electric motor between the hybrid magnetic radial bearing and a rotor and a stator of the electric motor, wherein the magnetic shield comprises a sleeve magnetic shield and a bushing magnetic shield, wherein the sleeve magnetic shield is secured to the drive shaft and between a sleeve of the hybrid magnetic radial bearing and the rotor and wherein the bushing magnetic shield is secured to a housing of the electric motor and retains a bushing of the hybrid magnetic radial bearing in a groove defined by the bushing magnetic shield.

12. The method of claim 11, wherein the magnetic field associated with the at least one hybrid magnetic bearing stabilizes the electric motor radially.

13. The method of claim 11, wherein stabilizing the electric motor at least in part by the at least one hybrid magnetic radial bearing comprises radially stabilizing the electric motor by fluid film mechanical forces between a bearing surface of the sleeve of the hybrid magnetic radial bearing and a bearing surface of the bushing of the hybrid magnetic radial bearing and radially stabilizing the electric motor by magnetic forces between a magnetic component of the sleeve of the hybrid magnetic radial bearing and a magnetic component of the bushing of the hybrid magnetic radial bearing.

14. A method of lifting fluid in a wellbore, comprising:
providing electric power to an electric motor of an electric submersible pump (ESP) assembly, wherein the electric motor is stabilized at least in part by at least one hybrid magnetic bearing disposed inside the electric motor, wherein a magnetic field produced by the at least one hybrid magnetic bearing is shielded from a magnetic field produced by the electric motor;
providing mechanical torque by the electric motor to a centrifugal pump of the ESP assembly; and
lifting a fluid in a wellbore by the centrifugal pump.

15. The method of claim 14, wherein the at least one hybrid magnetic bearing comprises a hybrid magnetic radial bearing that radially stabilizes the electric motor at least in part.

16. The method of claim 14, wherein the at least one hybrid magnetic bearing comprises a hybrid magnetic radial bearing that radially stabilizes the electric motor at least in part and comprises a hybrid magnetic thrust bearing that axially stabilizes the electric motor at least in part.

17. The method of claim 14, wherein the at least one hybrid magnetic bearing comprises two hybrid magnetic radial bearings that radially stabilize the electric motor at least in part and comprises a hybrid magnetic thrust bearing that axially stabilizes the electric motor at least in part.

18. The method of claim 14, wherein the at least one hybrid magnetic bearing is shielded from a magnetic field produced by the electric motor by a magnetic shield comprising electric metal having a magnetic relative permeability in the range of 40,000 to 300,000.

19. The method of claim 18, wherein the electric metal comprises a Heusler alloy or a nickel-iron alloy.

20. The method of claim 18, wherein the electric metal comprises mu-metal.

* * * * *